No. 851,936. PATENTED APR. 30, 1907.
A. HENDRICH.
GATE.
APPLICATION FILED NOV. 5, 1906.
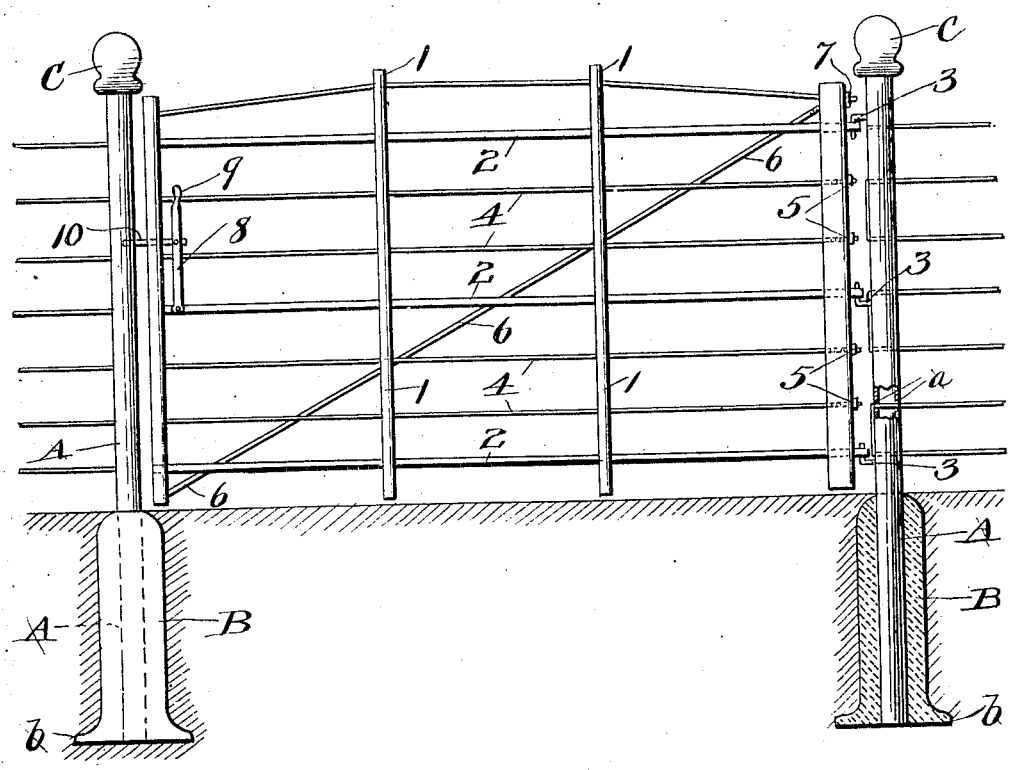
Witnesses
Inventor
August Hendrich
By D. A. Gowrick
Attorney

UNITED STATES PATENT OFFICE.

AUGUST HENDRICH, OF GREENCASTLE, INDIANA, ASSIGNOR TO THE HERCULES GATE COMPANY, OF PUTNAM COUNTY, INDIANA, A CORPORATION.

GATE.

No. 851,936.　　　　Specification of Letters Patent.　　　Patented April 30, 1907.

Application filed November 5, 1906. Serial No. 342,160.

*To all whom it may concern:*

Be it known that I, AUGUST HENDRICH, a citizen of the United States, residing at Greencastle, in the county of Putnam and State of Indiana, have invented certain new and useful Improvements in Gates, of which the following is a specification.

My invention relates to swinging gates and has for its object the provision of a gate that can be swung to either side of the supporting post, that is made up of horizontal bars of metal tubing having one of their ends provided with transverse holes for the pintle of the hinges, vertical pickets, horizontal rods secured to said vertical pickets and diagonal braces.

The construction of my improvements will be described in detail hereinafter and illustrated in the accompanying drawing which is a view showing my improved gate.

My improved gate comprises vertical bars or pickets 1 made of lengths of timber or other material through which extend tubular bars 2 having one of their ends provided with holes to receive the pintle of hinges 3 secured to one of the posts A, the upper of said hinges being reversed as shown so as to prevent the gate from being lifted from its position.

4 indicates horizontal rods passing through pickets 1 having one of their ends secured to the end picket of the gate while the other ends are threaded to receive nuts 5 to tighten said rods.

6 indicates a diagonal brace rod having one end secured to one of the end pickets and its other end threaded and provided with a nut 7 to adjust the length of the rod.

8 indicates a sliding bolt latch having pivotally secured thereto a lever arm 9 fulcrumed on the horizontal bar 2 in the center of the gate.

10 indicates a catch for latch 8.

Having thus described my invention what I claim is—

1. A gate comprising vertical pickets, horizontal bars secured in said pickets having holes adapted to receive the pintles of hinges, horizontal rods secured in said pickets, and a diagonal brace rod secured through said pickets, substantially as shown and described.

2. A gate comprising vertical pickets, tubular horizontal bars secured in said pickets and having holes adapted to receive the pintles of hinges, horizontal rods secured in said pickets, a diagonal brace rod secured in said pickets, a latch bolt slidably mounted in the end one of said vertical pickets, and a lever arm fulcrumed on the gate and pivotally secured to said latch bolt, substantially as shown and described.

In testimony whereof I hereto affix my signature in the presence of two witnesses.

AUGUST HENDRICH.

Witnesses:
　LIZZIE T. REED,
　HERMAN HOFFMANN.